US012630015B2

(12) United States Patent
Helbach

(10) Patent No.: US 12,630,015 B2
(45) Date of Patent: May 19, 2026

(54) MOTOR VEHICLE

(71) Applicant: Dr. Ing. h. c. F. Porsche AG, Stuttgart (DE)

(72) Inventor: Jan-Niklas Helbach, Asperg (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 18/648,117

(22) Filed: Apr. 26, 2024

(65) Prior Publication Data

US 2024/0359558 A1      Oct. 31, 2024

(30) Foreign Application Priority Data

Apr. 27, 2023    (DE) ..................... 10 2023 110 841.7

(51) Int. Cl.
*B60K 35/22*        (2024.01)
*B60K 35/55*        (2024.01)
*B60K 35/60*        (2024.01)
*B60K 37/20*        (2024.01)

(52) U.S. Cl.
CPC ........... *B60K 35/223* (2024.01); *B60K 35/55* (2024.01); *B60K 35/60* (2024.01); *B60K 37/20* (2024.01); *B60K 2360/166* (2024.01); *B60K 2360/21* (2024.01); *B60K 2360/771* (2024.01); *B60K 2360/774* (2024.01); *B60K 2360/785* (2024.01); *B60K 2360/794* (2024.01)

(58) Field of Classification Search
CPC ...... B60K 35/223; B60K 35/55; B60K 35/60; B60K 37/20; B60K 2360/21; B60K 2360/771; B60K 2360/785; B60K 2360/166; B60K 2360/794; B60K 2360/774

USPC ........................................................ 348/837
See application file for complete search history.

(56) References Cited

U.S. PATENT DOCUMENTS

| | | | |
|---|---|---|---|
| 10,137,813 B2 | 11/2018 | Helot | |
| 10,917,984 B2 | 2/2021 | Redeker et al. | |
| 10,919,456 B2 | 2/2021 | Helot | |
| 2012/0070618 A1* | 3/2012 | Sakamoto ............. | H10F 19/804 |
| | | | 428/156 |
| 2015/0298608 A1* | 10/2015 | Aufmkolk ................ | B60Q 3/54 |
| | | | 156/298 |
| 2016/0059698 A1* | 3/2016 | Diederichs ............. | B60K 35/50 |
| | | | 362/549 |
| 2017/0228023 A1* | 8/2017 | Vartanian ................ | G06F 3/016 |
| 2018/0067307 A1 | 3/2018 | Liubakka et al. | |
| 2018/0088887 A1* | 3/2018 | LeBlanc ........... | G06Q 30/0265 |
| 2018/0194202 A1* | 7/2018 | Gronenthal ............. | B60R 1/001 |
| 2018/0260001 A1* | 9/2018 | Klug ...................... | B60K 35/10 |

(Continued)

FOREIGN PATENT DOCUMENTS

| | | |
|---|---|---|
| DE | 19708610 | 9/1998 |
| DE | 202005014791 | 12/2005 |

(Continued)

*Primary Examiner* — Matthew David Kim
(74) *Attorney, Agent, or Firm* — Buchanan Ingersoll & Rooney PC

(57)                    ABSTRACT

A motor vehicle has a vehicle interior in which a flexible OLED display device is arranged, To create a high degree of individualization with a simple design, the flexible OLED display device is part of an interior panel and at least one electrical servomotor is provided and adjusts the flexible OLED display device for the representation of spatial structures.

19 Claims, 3 Drawing Sheets

(56) References Cited

U.S. PATENT DOCUMENTS

| | | | |
|---|---|---|---|
| 2019/0213931 A1* | 7/2019 | Brubaker | B60Q 1/2607 |
| 2020/0035177 A1* | 1/2020 | Kawachi | G11C 19/28 |
| 2020/0083468 A1* | 3/2020 | Zhang | H10K 59/179 |
| 2020/0276792 A1* | 9/2020 | Laluet | B32B 17/10174 |
| 2021/0051067 A1 | 2/2021 | Barkovic et al. | |
| 2021/0341940 A1* | 11/2021 | Baik | G01C 21/3896 |
| 2022/0303607 A1* | 9/2022 | Gewickey | H04N 21/41422 |
| 2023/0254986 A1* | 8/2023 | Wall | H05K 5/0217 |
| | | | 361/807 |
| 2025/0091525 A1* | 3/2025 | Chen | B60R 11/02 |

FOREIGN PATENT DOCUMENTS

| | | |
|---|---|---|
| DE | 102004059874 | 6/2006 |
| DE | 102013000366 | 7/2014 |
| DE | 102014221091 | 3/2016 |
| DE | 102018104567 | 8/2019 |
| DE | 102018213058 A1 | 3/2020 |
| DE | 102019213255 | 8/2020 |
| DE | 102019120766 | 2/2021 |
| DE | 102020113721 | 11/2021 |

* cited by examiner

MOTOR VEHICLE

CROSS-REFERENCE TO RELATED APPLICATION

This application claims priority on German Patent Application No 10 2023 110 841.7 filed Apr. 27, 2023, the entire disclosure of which is incorporated herein by reference.

BACKGROUND

Field of the Invention

The invention relates to a motor vehicle having a vehicle interior with a flexible organic light emitting diode (OLED) display device.

Related Art

U.S. Pat. No. 10,919,456 discloses a motor vehicle where the vehicle interior has an instrument cluster with a flexible OLED display device. The flexible OLED display device has an adjustment device configured to adjust and bend the display device from a stowed position to a use position.

DE 197 08 610 A1 discloses a self-illuminated pixel matrix display device with an organic light-emitting element (OLED) for information representation in a motor vehicle while consuming a low amount of energy.

DE 10 2013 000 366 A1 discloses a display device for a motor vehicle with an image generating device for providing image content. The display device has a composite pane with an inner pane facing a viewer and an outer pane. At least one area of the composite pane forms a presentation surface that is used to output the image content. A contrast layer is arranged between the inner pane and the outer pane at a section of the presentation surface, and the transparency of the contrast layer can be changed. The transparency of the composite pane is intended to provide a better presentation of image content in a head-up display.

U.S. Pat. No. 10,137,813 discloses a motor vehicle with a seat that has a backrest with an adjustable back. The motor vehicle also has an interior device and a controllable device. A touch-sensitive screen for controlling the controllable device is arranged in or on the interior device. The inclination, curvature and/or x-position of the screen is adjustable relative to the interior device.

DE 10 2018 213 058 A1 discloses a display device for a motor vehicle with a display pane having a longitudinal extension and a transverse extension. The display device also has a drive device configured to move the display pane along its longitudinal extension. Two positioning elements are arranged on opposite sides along the longitudinal extension of the display pane and receiving areas receive a section of the display pane when it is moved from a storage state to an operating state. The positioning elements enable a curvature of the display pane in the operating state.

DE 10 2019 120 766 A1 discloses a screen device for a motor vehicle is known. The screen device includes a rollable display having a width direction and a height direction that is movable between a stowed position and an unrolled position.

DE 20 2005 014791 U1 discloses an interior lighting device for a ceiling liner of a motor vehicle. The lighting device has an OLED screen configured as a light source that can radiate light into the interior of the motor vehicle.

US 2012/0051067 A1 discloses a multi-layer OLED display device in the area of a dashboard.

US 2018/0067307 A1 discloses an OLED display device in the area of a windscreen.

Modern motor vehicles want personalized features adapted to the particular desires of a user. Individual personalization can be complex and expensive due to different interior elements, for example chrome bars. Nevertheless, individually adjustable ambient lighting is being offered to enable the desired individualization of a vehicle interior. However, a disadvantage of prior art motor vehicles is that individualization of a large area of the vehicle interior of a motor vehicle by a user is not possible or only very limited.

An object of the invention it to provide a significantly increased degree of individualization of an interior of a motor vehicle.

SUMMARY OF THE INVENTION

The invention relates to a motor vehicle with an interior that has at least one interior panel. The at least one interior panel has at least one flexible OLED display device that is capable of producing individual images. The at least one flexible OLED device may be an OLED film. OLEDs are thin luminous components made of organic materials that differ from inorganic light emitting diodes (LEDs) in that OLEDs can be produced inexpensively using thin-layer technology.

The at least one interior panel that has the at least one OLED device includes or cooperates with an electric servomotor that can adjust the flexible OLED display device to depict spatial, three-dimensional and/or relief-like structures.

The motor vehicle has a vehicle interior that comprises vehicle seats, a center console, a ceiling liner, a dashboard and interior door panels. The at least one interior panel with the at least one flexible OLED device may be provided on at least one of the ceiling liner, the interior door panel, parts of the center console, and parts of the seats, such as rear sides of the front seats. The at least one electrical servomotor is arranged behind the flexible OLED display device and adjusts the OLED display device, for example folds, bends, or bulges OLED device, such that a spatial impression is imparted to a viewer. Simply by using such an OLED display device as an interior panel, it is possible to design larger surfaces of a vehicle interior individually, for example using landscape motifs, people or other representations so that an extremely high degree of individualization is relatively easy to offer. The at least one electric servomotor also enables local adjustments to the flexible OLED display device for creating a relief-like design and a particularly high degree of individualization. The ability to adjust the flexible OLED display device using the at least one servomotor enables further enhancement or support for the spatial representation of an image shown using the OLED display device. Thus, the invention offers a nearly unlimited degree of individualization of a vehicle interior comparatively simply.

In some embodiment of the motor vehicle, the at least one electric servomotor is configured for curving, bending, and/or folding the flexible OLED display device. The skilled artisan would appreciate from just this incomplete list and this disclosure the variety of optional spatial settings of the flexible OLED display device that can be obtained by the servomotor or servomotors. For example, corners or edges can be illustrated in images, and also can be supported spatially in a relief-like manner by adjusting the flexible OLED display device.

The motor vehicle also can have plural electric servomotors that can generate particularly impressive relief images.

In some embodiments, the flexible OLED display device is part of a ceiling liner of the motor vehicle. Thus, for example, the motor vehicle can represent a particularly appealing starry sky, or the motor vehicle can have an outdoor camera so that the actual sky can be displayed without a sliding roof. Thus, the motor vehicle can be a closed motor vehicle, i.e. a motor vehicle with a closed roof. Free individualized motifs can also be represented in the OLED display device in the ceiling liner.

In some embodiments of the motor vehicle, the flexible OLED display device is part of an interior door panel. Here, as well, freely selectable representations may offer a high level of individualization.

At least one of the flexible OLED display devices can be part of a rear side of a seat back of a front seat. This allows the rear side of the seat back to be occupied by a freely designable motif or to play freely selectable media, for example, such as television programs or feature films.

The motor vehicle according to some embodiments comprises a computing device, a navigation system and/or at least one outdoor camera that is/are communicably connected to the OLED display device. As a result, if the exterior camera is configured as a vehicle environment camera, it is possible to display an image of an exterior environment in a rear window, a side window, an interior door panel, etc., whereby the respective component appears transparent. This is particularly advantageous during maneuvering operations, such as parking operations, in tight limited space conditions, because objects that are laterally close to the motor vehicle are easily visually detectable.

The flexible OLED display device of some embodiments is expediently able to be rolled up into a non-use state. It is conceivable in this case that the flexible OLED display device forms part of the interior door panel in a use state and thereby generates an individualizable vehicle interior image, whereas when it is in a non-use state it is rolled up and does not take up space. A wide variety of vehicle interiors can be implemented with and without visual representation using the OLED display device.

The flexible OLED display device of some embodiments is part of a windshield and/or dashboard. In particular, if the OLED display device is part of a windshield, it could take the place of a so-called head-up display so that travel information, for example a vehicle speed, a maximum speed allowed or a vehicle route, can be displayed via the flexible OLED display device. It is also easily possible to display weather data. In the same manner, information of this kind may also be displayed using a flexible OLED display device that is part of a dashboard.

In another embodiment of the motor vehicle, the flexible OLED display device is part of a center console. Again, freely selectable images may be displayed. For example, a camera arranged on an inside of a center console compartment can transmit an image via the computer device to the flexible OLED display device, such that a user of the vehicle can, via the flexible OLED display device, see what is in this center console compartment without opening the center console compartment.

A significantly increased degree of individualization of an otherwise standardized motor vehicle can be achieved by the motor vehicle disclosed herein. It is particularly advantageous that an individualization, i.e., an adjustment of an optical impression of the vehicle interior, can be quickly and extremely easily adjusted at the touch of a button, so that a completely different vehicle interior feel can be quickly and easily generated even during a driver change.

DETAILED DESCRIPTION

Figure 1:
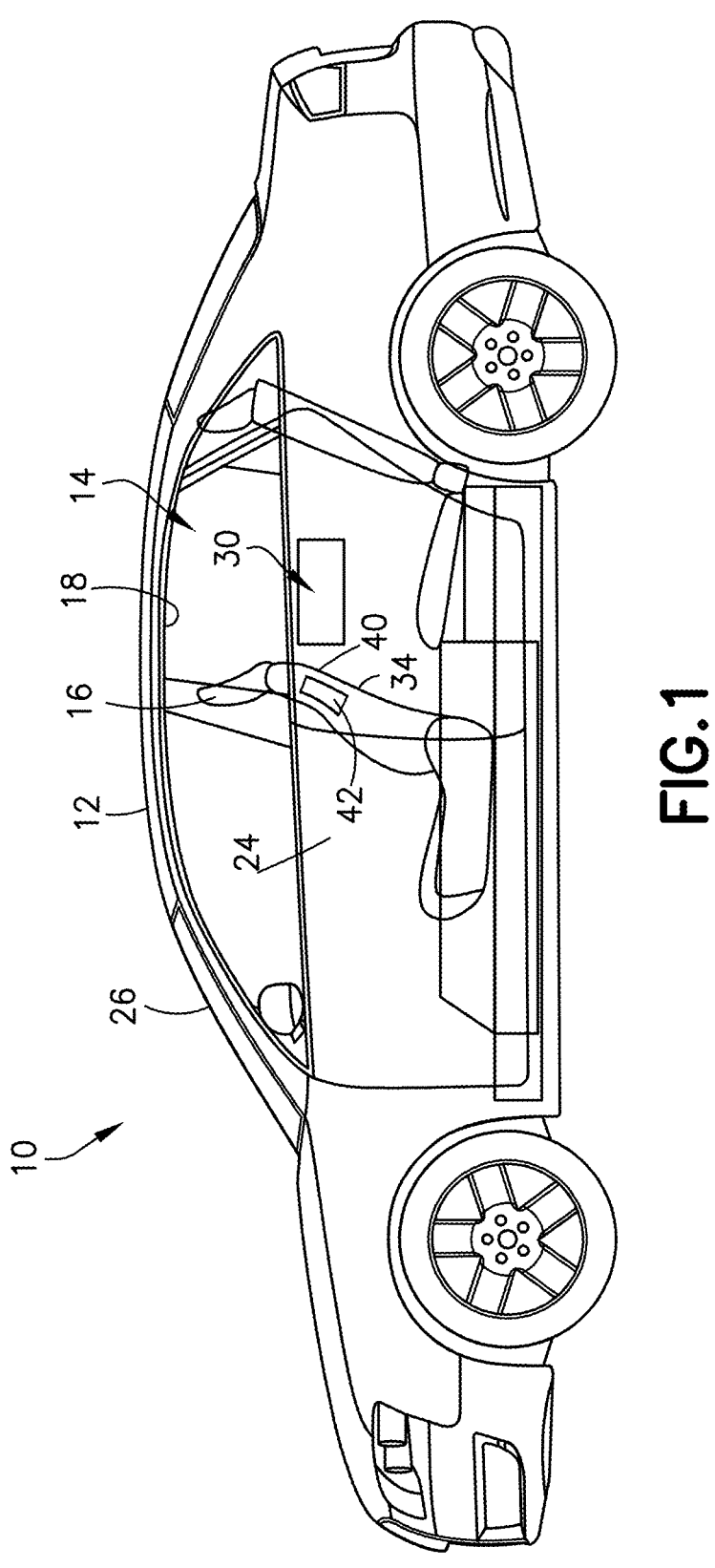
FIG. 1 is a side elevational view of a motor vehicle in accordance with an embodiment of the invention.
Figure 2:
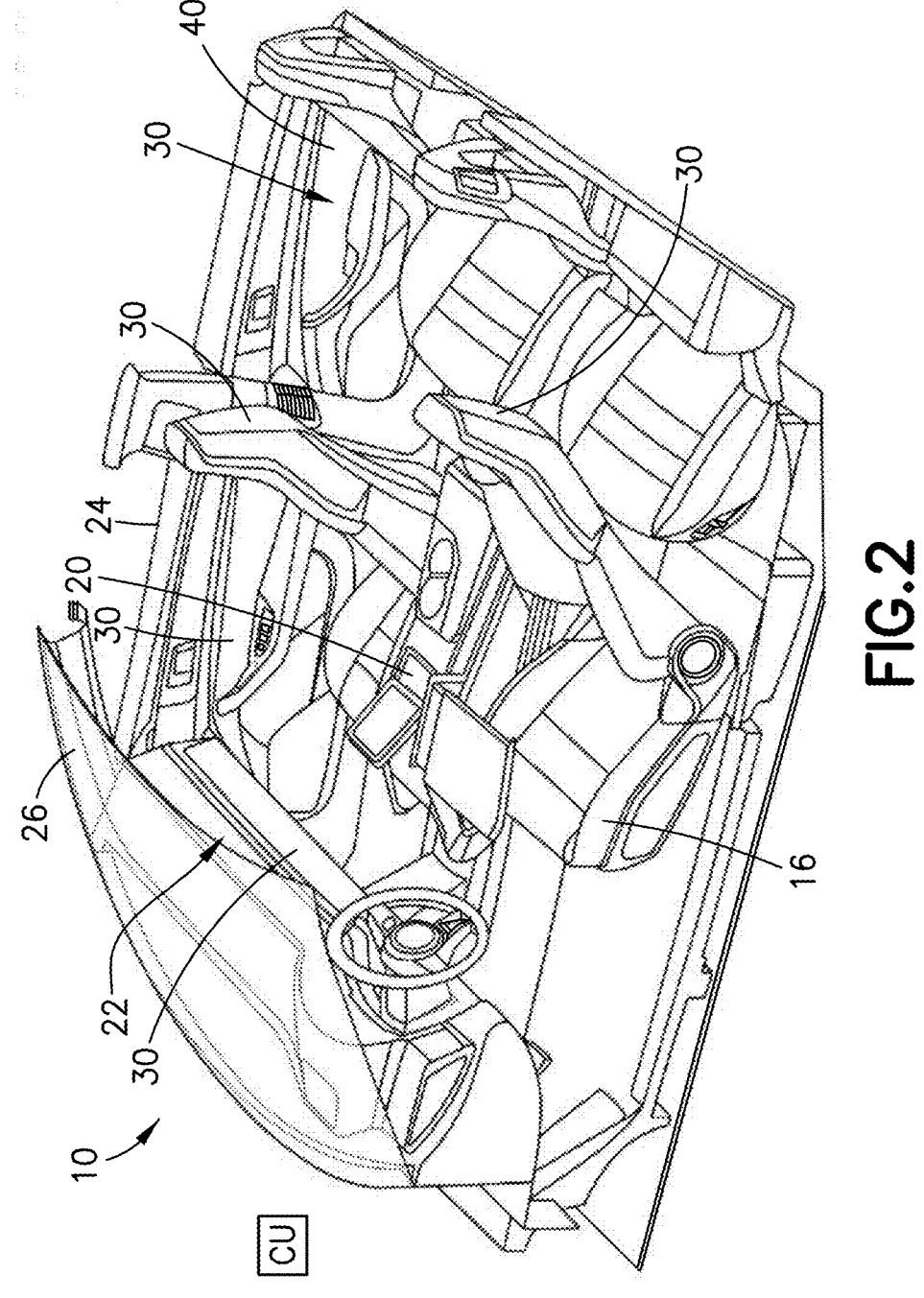
FIG. 2 is a perspective view of the motor vehicle of FIG. 1 with the roof and the left exterior removed to illustrate parts of the vehicle interior more clearly.
Figure 3:
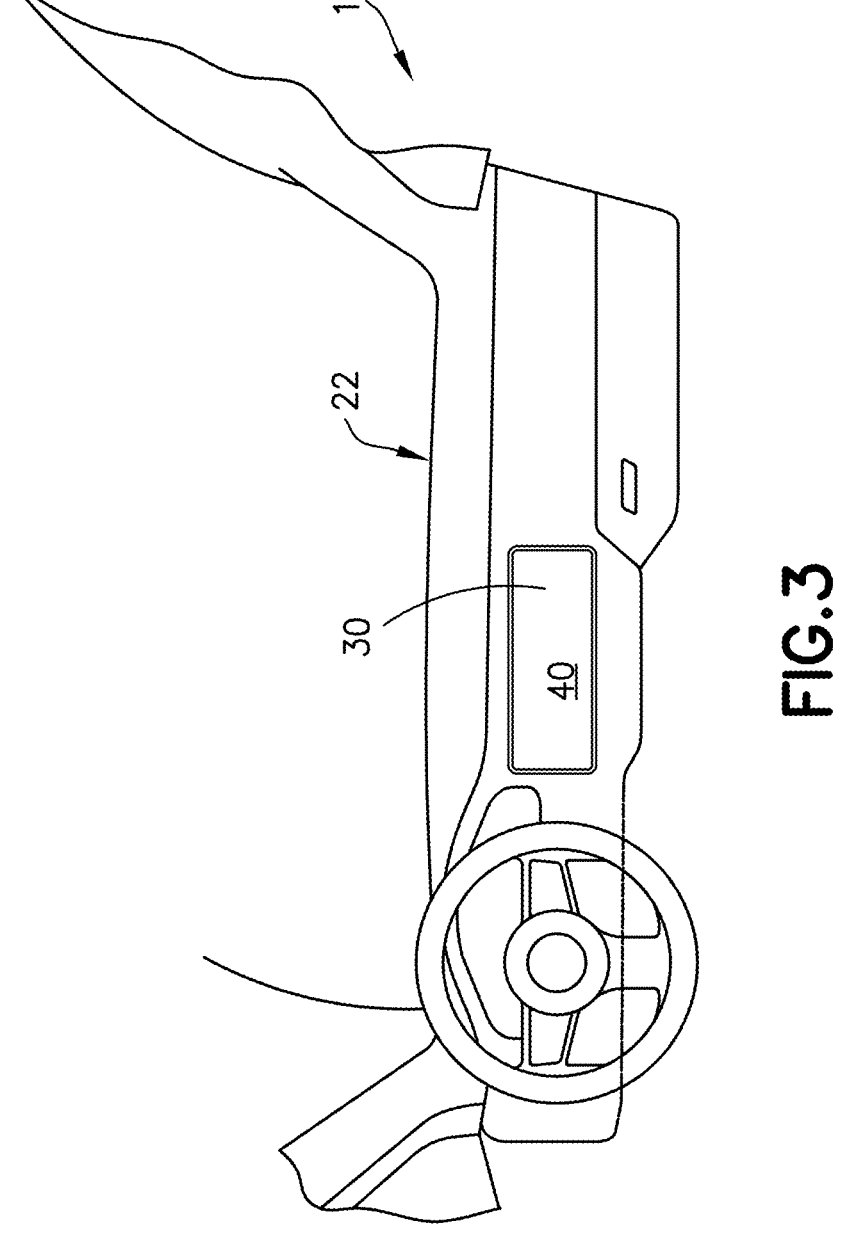
FIG. 3 is an elevational view of dashboard and front windshield of the motor vehicle.

A motor vehicle in accordance with an embodiment of the invention is identified by the numeral 10 in FIGS. 1-3. The motor vehicle 10 has a roof 12 and a vehicle interior 14 that comprises vehicle seats 16, a ceiling liner 18, a center console 20 a dashboard 22, doors 24 and a windshield 26. At least one interior panel 30 is disposed in the vehicle interior 14 and may be disposed on one or more of: the ceiling liner 18 covering an inwardly facing surface of the vehicle roof 12; a rearwardly facing surface 34 of at least one of the vehicle seats 16; the center console 20; the dashboard 22, the doors 26 and possibly other surfaces of the vehicle interior 14.

At least one of the interior panels 30 in the vehicle interior 14 is provided with at least one flexible OLED display device 40. Thus, the OLED display device 40 can be on the ceiling liner 32, the door 24, parts of the center console 20, the rearwardly facing surfaces of the seats 16 and/or other surfaces in the vehicle interior 14. At least one electrical servomotor 42 is arranged behind the flexible OLED display device and adjusts the OLED display device, for example folds, bends, or bulges OLED device, such that a spatial impression is imparted to a viewer. Simply by using such an OLED display device 40 as an interior panel, it is possible to design larger surfaces of a vehicle interior individually, for example using landscape motifs, people or other representations so that an extremely high degree of individualization is relatively easy to offer. The at least one electric servomotor 42 also enables local adjustments to the flexible OLED display device 40 for creating a relief-like design and a particularly high degree of individualization. The ability to adjust the flexible OLED display device 40 using the at least one servomotor 42 enables further enhancement or support for the spatial representation of an image shown using the OLED display device 40.

The motor vehicle 10 further has a control unit CU that is connected to and communicates with each of the OLED display devices 40 and each of the servomotors 42. The control unit CU also is connected to a user interface, such as a touch screen incorporated into the center console 20 or the dashboard 22 so that the driver can control whether any or all of the OLED display devices 40 is operated and the type of visual display to be outputted by each of the OLED display devices 40. A "control unit" may be understood in connection with this disclosure four to mean a machine or electronic circuitry or a high-performance computer, for example. In particular, a control unit may be a master processor (central processing unit (CPU)), a microprocessor, or a microcontroller, for example an application-specific integrated circuit or a digital signal processor, optionally in combination with a memory unit for storing program instructions to achieve various OLED displays, etc. A control unit may also be understood to mean a virtualized processor, a virtual machine, or a soft CPU. For example, a control unit may also be a programmable processor equipped with configuration steps for carrying out the method described herein or configured with configuration steps in such a way that the programmable processor realizes the features of the method and system described herein. In addition, highly parallel computing units and high-performance graphics modules may be provided. A "memory unit" or "memory module" and the like may, for example, be understood in connection with this disclosure to mean a non-volatile memory in the form of a flash memory (Flash EEPROM) or a permanent memory, such as a hard drive.

The motor vehicle 10 of some embodiments also has at least one outdoor camera 48 that is/are communicably connected to the control unit and the OLED display devices 40. As a result, the exterior camera 48 can be configured as a vehicle environment camera that displays an image of an exterior environment in a rear window, a side window, an interior door panel, etc. Thus, the respective component of the vehicle 10 appears transparent. This aspect is particularly advantageous during maneuvering operations, such as parking operations, in tight limited space conditions, because objects that are laterally close to the motor vehicle 10 are easily visually detectable. The exterior camera 48 can be directed toward the sky so that the OLED display devices 40 on the ceiling liner 18 displays the actual sky without a sliding roof.

The invention claimed is:

1. A motor vehicle having a vehicle interior with plural interior panels, the motor vehicle comprising:

at least one flexible OLED display device defining part of at least one of the interior panels; and at least one electrical servomotor that is operable for adjusting the at least one flexible OLED display device into at least one nonplanar configuration for representation of spatial structures, wherein the at least one electrical servomotor is positioned behind the at least one flexible OLED display device and causes the at least one flexible OLED display device to convexly bulge and concavely bend such that a spatial impression is imparted to a viewer.

2. The motor vehicle of claim 1, wherein the at least one electric servomotor is operable to curve, bend, and/or fold the flexible OLED display device.

3. The motor vehicle of claim 2, wherein the flexible OLED display device is part of a ceiling liner.

4. The motor vehicle of claim 3, wherein the flexible OLED display device is part of an interior door panel.

5. The motor vehicle of claim 4, wherein the flexible OLED display device is part of a rear side of a seat back.

6. The motor vehicle of claim 1, further comprising a computer device that is communicatively connected to the OLED display device.

7. The motor vehicle of claim 6, further comprising a navigation system that is communicatively connected to the computer device and the OLED display device.

8. The motor vehicle of claim 6, further comprising an outdoor camera that is communicatively connected to the computer device and the OLED display device.

9. The motor vehicle of claim 1, wherein the flexible OLED display device is configured to be rolled up when in a non-use state.

10. The motor vehicle of claim 1, wherein the flexible OLED display device is part of a windshield.

11. The motor vehicle of claim 10, wherein the flexible OLED display screen is incorporated into the windshield for displaying weather, speed, and other data on the flexible OLED display device that forms part of the windshield.

12. The motor vehicle of claim 1, wherein the flexible OLED display device is part of a dashboard.

13. The motor vehicle of claim 1, wherein the flexible OLED display device is part of a center console.

14. The motor vehicle of claim 13, wherein the flexible OLED display device is connected to an interior camera, which is disposed within the center console, for displaying contents of the center console on the flexible OLED display device that forms part of the center console.

15. The motor vehicle of claim 1, wherein the flexible OLED display device is part of a ceiling liner.

16. The motor vehicle of claim 15, wherein the flexible OLED display device is connected to an exterior camera for displaying an outside sky on the flexible OLED display device that forms part of the ceiling liner.

17. The motor vehicle of claim 1, wherein the flexible OLED display device is part of an interior door panel.

18. The motor vehicle of claim 17, wherein the flexible OLED display device is connected to an outdoor camera, which is positioned on an exterior of the vehicle, for displaying an outside environment behind the interior door panel such that the interior door panel appears transparent.

19. The motor vehicle of claim 1, wherein the flexible OLED display device is part of a rear side of a seat back.

* * * * *